United States Patent [19]
Pirklbauer et al.

[11] Patent Number: 5,190,719
[45] Date of Patent: Mar. 2, 1993

[54] PLANT FOR THE PRODUCTION OF MOLTEN METALS

[75] Inventors: Wilfried Pirklbauer, Niederneukirchen; Alfred Weber, Luftenberg; Johann Auer, Florian, all of Austria

[73] Assignee: Voest-Alpine Industrianlagenbau GmbH, Linz, Austria

[21] Appl. No.: 788,362

[22] Filed: Nov. 6, 1991

[30] Foreign Application Priority Data

Nov. 19, 1990 [AT] Austria ............................. 2334/90

[51] Int. Cl.$^5$ ............................................. C21C 5/38
[52] U.S. Cl. .................................... 266/144; 266/176; 266/183; 266/199; 266/901
[58] Field of Search ............... 266/144, 159, 177, 183, 266/199, 200, 900, 901

[56] References Cited

U.S. PATENT DOCUMENTS

| | | | |
|---|---|---|---|
| 2,618,548 | 11/1952 | Drake | 75/573 |
| 3,022,990 | 2/1962 | McFeaters et al. | 266/158 |
| 4,369,955 | 1/1983 | Park | 266/900 |

FOREIGN PATENT DOCUMENTS

| | | |
|---|---|---|
| 2321443 | 6/1989 | European Pat. Off. |
| 880636 | 6/1953 | Fed. Rep. of Germany |
| 1085309 | 11/1952 | France |
| 648215 | 1/1989 | Japan .................... 75/581 |

Primary Examiner—Melvyn J. Andrews
Attorney, Agent, or Firm—Hopgood, Calimafde, Kalil, Blaustein & Judlowe

[57] ABSTRACT

A plant for the production of molten metals includes a melting vessel in whose wall burners and optionally oxygen-containing-gas feeding ducts are installed and on whose upper end a charging device as well as a gas evacuation duct receiving the offgases forming enter.

In order to enable the continuous charging of the melting vessel by avoiding any unintentional escape of gas from the melting vessel, both the gas evacuation duct and the charging means run into the upper end of the furnace shaft laterally and approximately diametrically opposite each other. The charging means projects into a charging opening brushed over by a gas curtain and an intake chute for charging material is provided below the charging opening in a manner directed towards the center of the furnace shaft. The intake chute forms a projection protruding inwardly like a nose relative to the wall of the furnace shaft and followed by a wall section inclined relative to the lower end region of the furnace shaft and passing over into the wall of the furnace shaft.

11 Claims, 1 Drawing Sheet

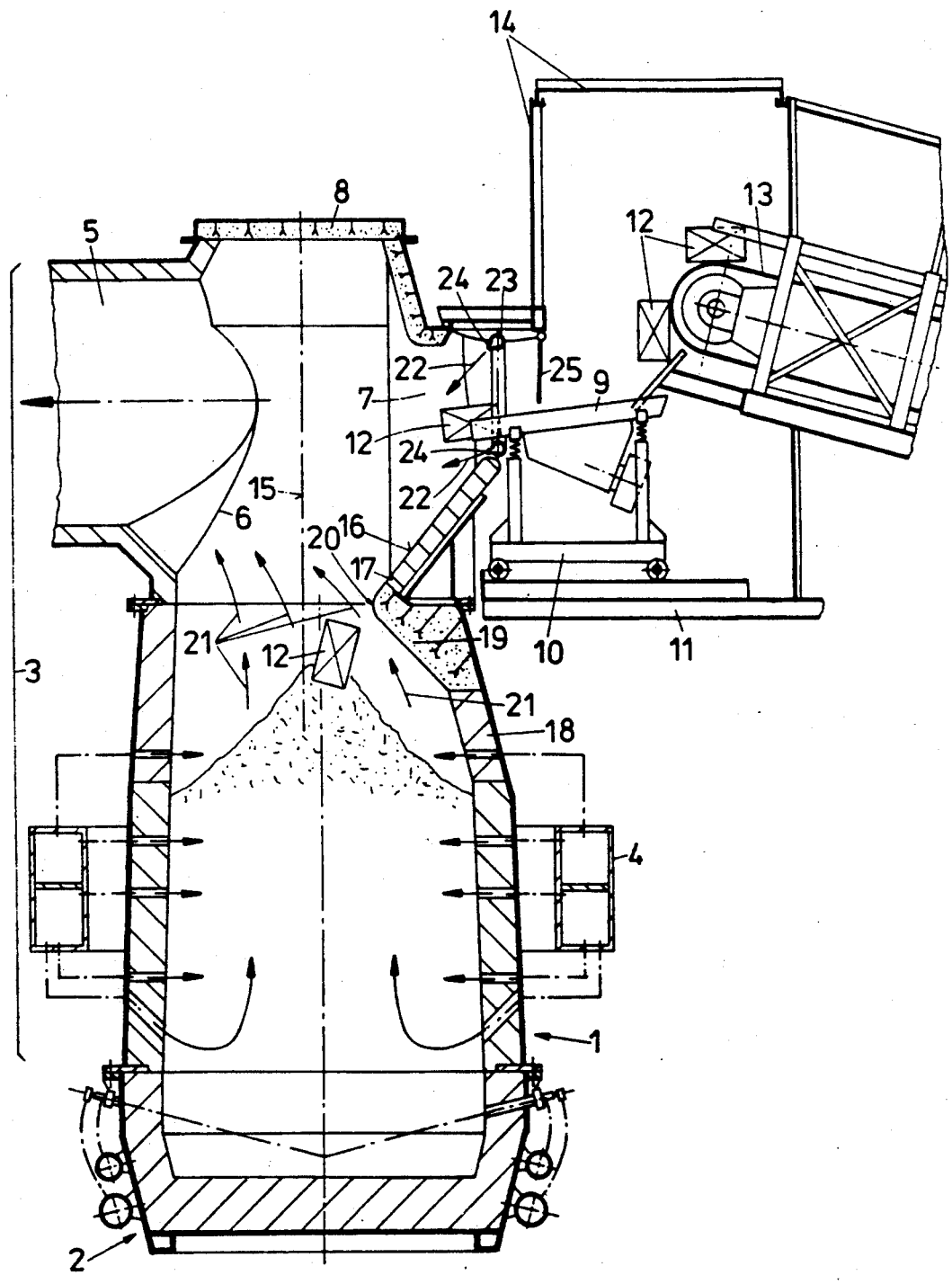

PLANT FOR THE PRODUCTION OF MOLTEN METALS

The invention relates to a plant for the production of molten metals, in particular of steel, comprising a melting vessel in whose lower end region a tap opening is provided for molten metal, in whose wall defining a furnace shaft burners and if desired, ducts feeding oxygen-containing gases are installed, and on whose upper end a charging means as well as a gas evacuation duct receiving the offgases forming enter.

A plant of this type is known from EP-A 2 321 443. With this known plant, the melting vessel is designed as a tiltable converter continuously smelting scrap and/or pig iron. The charging of scrap is effected via a scrap chute, the evacuation of gases is effected via a converter offgas system.

With conventional melting vessels, problems arise in the charging region, in particular when charging lumpy material, such as automobile scrap in the baled form. For reasons of temperature constancy and in order to ensure a uniform flow of the melt, continuous charging is suitable for continuous melting. In doing so, the charged material constantly falls onto a charged burden already present in the interior of the melting vessel, thus saving the brickwork of the melting vessel. Another problem is to be seen in that the escape of offgases is hardly avoidable during charging, in particular if charging proceeds continuously. To avoid the escape of gases is of particular interest if low-grade or heavily contaminated scrap is to be melted.

The invention aims at avoiding these disadvantages and difficulties and has as its object to provide a plant of the initially defined kind, in which the charging material, in particular scrap, can be introduced into the melting vessel in a continuous manner by reliably avoiding the escape of offgases at the charging means.

In accordance with the invention, this object is achieved in that both the gas evacuation duct and the charging means run into the upper end of the furnace shaft laterally and approximately diametrically opposite each other, wherein the charging means projects into a charging opening brushed over by a gas curtain and an intake chute for charging material is provided below the charging opening in a manner directed towards the center of the furnace shaft, which intake chute forms a projection protruding inwardly like a nose relative to the wall of the furnace shaft and followed by a wall section inclined relative to the lower end region of the furnace shaft and passing over into the wall of the furnace shaft.

According to a preferred embodiment, the lower end of the intake chute is arranged on a height level on which the lower rim of the mouth of the gas evacuation means into the furnace shaft is located, or slightly below.

Advantageously, a gas duct peripherally surrounding the charging opening is provided to form the gas curtain, including gas outlets directed into the interior of the furnace shaft.

Suitably, the charging arrangement is comprised of a continuous conveying means, such as a vibrating channel, which reaches through the charging opening as far as to the starting region of the intake chute.

As an additional safety measure, the conveying means advantageously is surrounded by an enclosure following the charging opening.

To ensure its optimum durability, the intake chute suitably is formed by a massive steel plate, such as a steel slab.

A curtain-apron provided externally of the charging opening advantageously constitutes an additional means of protection against the escape of gas.

A preferred embodiment is characterized in that an air suction means is provided within the enclosure, which is in flow-connection with the gas duct surrounding the charging opening, thus being able to generate a negative pressure within the enclosure as a further safety measure against the escape of gas. Thereby, even strongly pulsedly incurring offgases can be controlled.

In the following, the invention will be explained in more detail by way of an exemplary embodiment with reference to the accompanying drawing, which illustrates in section an installation for continuously producing molten steel or a steel pre-product.

A stationarily supported refractorily lined melting vessel 1 comprises a bottom part 2 and a furnace shaft 3 following upon the bottom part. The furnace shaft 3 of the melting vessel is surrounded by an annular frame 4 stationarily mounted to a platform, on which it is supported via brackets (not illustrated). This annular frame 4 is designed to be hollow, its cavity serving to supply the media necessary for operating of the melting vessel 1 (combustion gases, oxygen-containing gases, etc.).

A gas duct 5 laterally runs into the upper end of the furnace shaft 3. A charging opening 7 is provided approximately diametrically opposite the mouth 6 of the gas duct 5. The furnace shaft 3 is upwardly closed by a lid 8.

A continuous conveying means 9 designed as a vibrating chute protrudes into the charging opening 7 and is supported on a car 10, which is displaceable in the horizontal direction on a charging platform 11 for furnace maintenance purposes. The stock to be charged, such as, e.g., bales of scrap 12, reach the vibrating chute 9 by means of a conveying belt 13. Both the conveying belt 13 and the vibrating chute 9 are surrounded by an enclosure 14 closely following upon the charging opening 7.

Below the charging opening 7, an intake chute 16 is provided, which is oriented obliquely to the center 15 of the furnace shaft 3 and is formed by a massive steel plate, such as a slab. Via this intake chute 16, the charging stock 12 reaches approximately the center 15 of the furnace shaft 3. A wall part 19 follows upon the lower end 17 of the intake chute 16, connecting this end 17 with the wall 18 of the furnace shaft 3 and directed towards the bottom of the melting vessel.

The wall part 19, together with the intake chute, forms a nose-like projection 20 protruding far into the interior of the furnace shaft 3, through which the gases forming in the melting vessel 1 and injected into the melting vessel are conducted in the direction of arrows 21 to the mouth 6 of the gas evacuation duct 5 located opposite the projection 20. The lower end 17 of the intake chute 16 and the wall part 19 following upon this end are located at a level immediately below the lower rim of the mouth 6 of the gas evacuation duct 5.

The charging opening 7 is sealed by a gas curtain 22. A gas feed 23 is provided for the formation of this gas curtain 22 along the rim of the charging opening 7, including gas outlets 24 directed towards the interior of the furnace shaft 3, through which the fed gas—preferably air sucked in from the enclosure 14 by a suction means—flows obliquely towards the center 15 of the furnace shaft 3.

This gas curtain 22, together with the nose-like projection 20, ensures the furnace offgases to be safely conducted into the gas evacuation duct 5. Aprons and curtains 25 arranged beyond the charging opening 7 may be provided as additional measures such that no offgases will escape even if incurred pulsedly, but a short-term accumulation of the offgases in the upper part of the furnace shaft 3 is rendered possible.

The melt forming in the melting vessel is continuously drawn off via a tap hole (not illustrated) and, if desired, is conducted into a metallurgical vessel for aftertreatment.

What we claim is:

1. In a melting vessel comprising an upstanding shaft furnace including a wall defining said furnace disposed about a longitudinal axis of this shaft furnace,
   said shaft furnace characterized by a lower portion and a co-axially extending upper portion,
   said lower portion accommodating burners disposed peripherally about the wall of said shaft furnace and optionally including ducts for feeding oxygen-gas to the interior of said furnace,
   said upper furnace portion including a charging opening through which material to be melted is fed by charging means disposed in the upper portion of said furnace,
   a gas evacuation duct being provided in said upper portion of said furnace for receiving offgases formed during operation of said melting vessel, the improvement:
   wherein both said gas evacuating duct and said charging means in said upper portion of said shaft furnace are disposed laterally and approximately diametrically opposite to each other such as to define a chamber therebetween,
   said duct characterized by a mouth entering said chamber,
   said charging means extending into said charging opening,
   said charging opening having means for providing a gas curtain substantially across said opening,
   wherein an inclined intake chute is disposed adjacent to and below said charging opening for feeding material to be melted into said shaft furnace,
   said inclined chute extending downwardly towards the axis of said shaft furnace and terminating against a wall section of said furnace to provide a protruding nose-like projection projecting inwardly toward said axis from said furnace wall,
   said wall section extending below said nose-like projection and being inclined relative to said lower furnace portion and merging with said furnace wall.

2. The melting vessel as in claim 1, wherein the mouth of said evacuating duct terminates into a rim at its lower portion opposite the terminal end portion of said inclined intake chute.

3. The melting vessel as in claim 2, wherein the end portion of said intake chute terminates at a level below that of the rim of said chute mouth.

4. The melting vessel as in claim 1, wherein said means for providing the gas curtain comprises a gas duct peripherally surrounding said charging opening having gas outlets which are directed into said chamber of said upper furnace portion for forming said gas curtain.

5. The melting vessel as in claim 1 wherein said charge means comprises a continuous conveyor which extends through the charge opening to said intake chute.

6. The melting vessel as in claim 5, wherein said continuous conveyor includes a vibrating channel for feeding the material to shaft furnace.

7. The melting vessel as in claim 5, wherein said charging opening and said continuous conveyor are confined within an enclosure.

8. The melting vessel as in claim 1, wherein said intake chute is formed of a massive steel plate.

9. The melting vessel as in claim 8, wherein said steel plate is a steel slab.

10. The melting vessel as in claim 1, further comprising a suspended apron disposed outside of said charge opening.

11. The melting vessel as in claim 7, further comprising a gas duct peripherally surrounding said charging opening and including gas outlets directed into said chamber of said upper portion of said shaft furnace for providing said gas curtain, including air suction means in said enclosure flow-connected to said gas duct.

* * * * *